Feb. 16, 1943. G. W. EMMERT 2,311,217
QUIZ GAME
Filed March 31, 1941 4 Sheets-Sheet 2
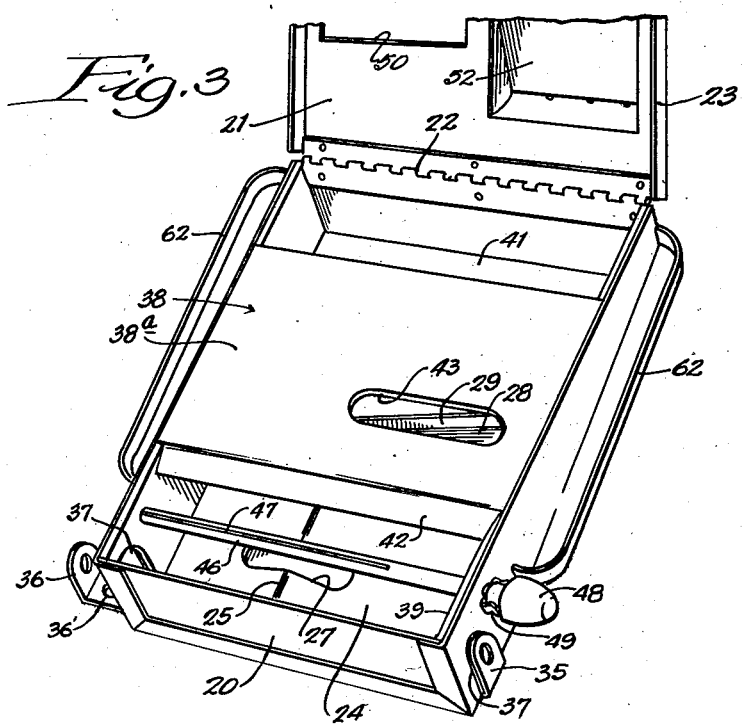
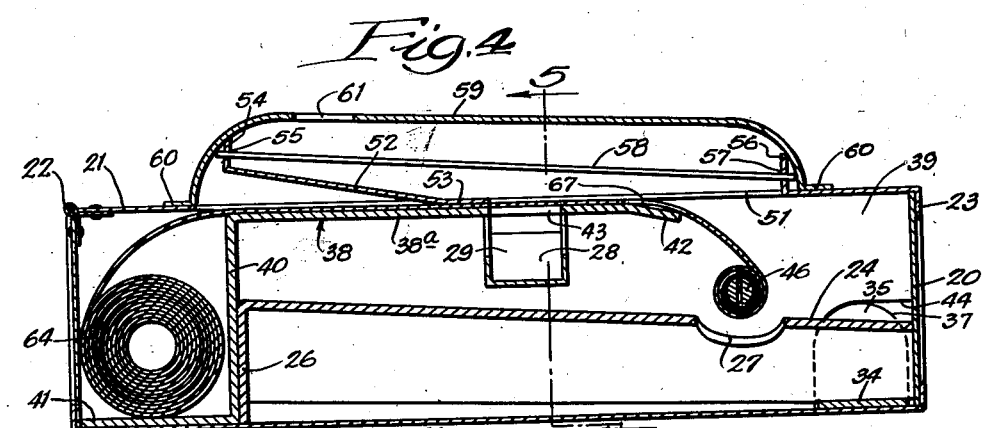
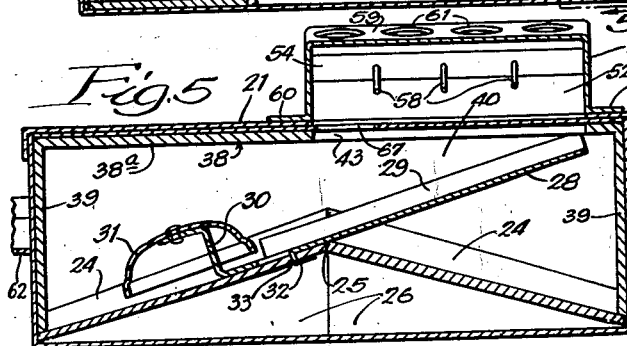
Inventor:
George W. Emmert.
By McCabb, Hendt and Wilkinson
Attorneys.

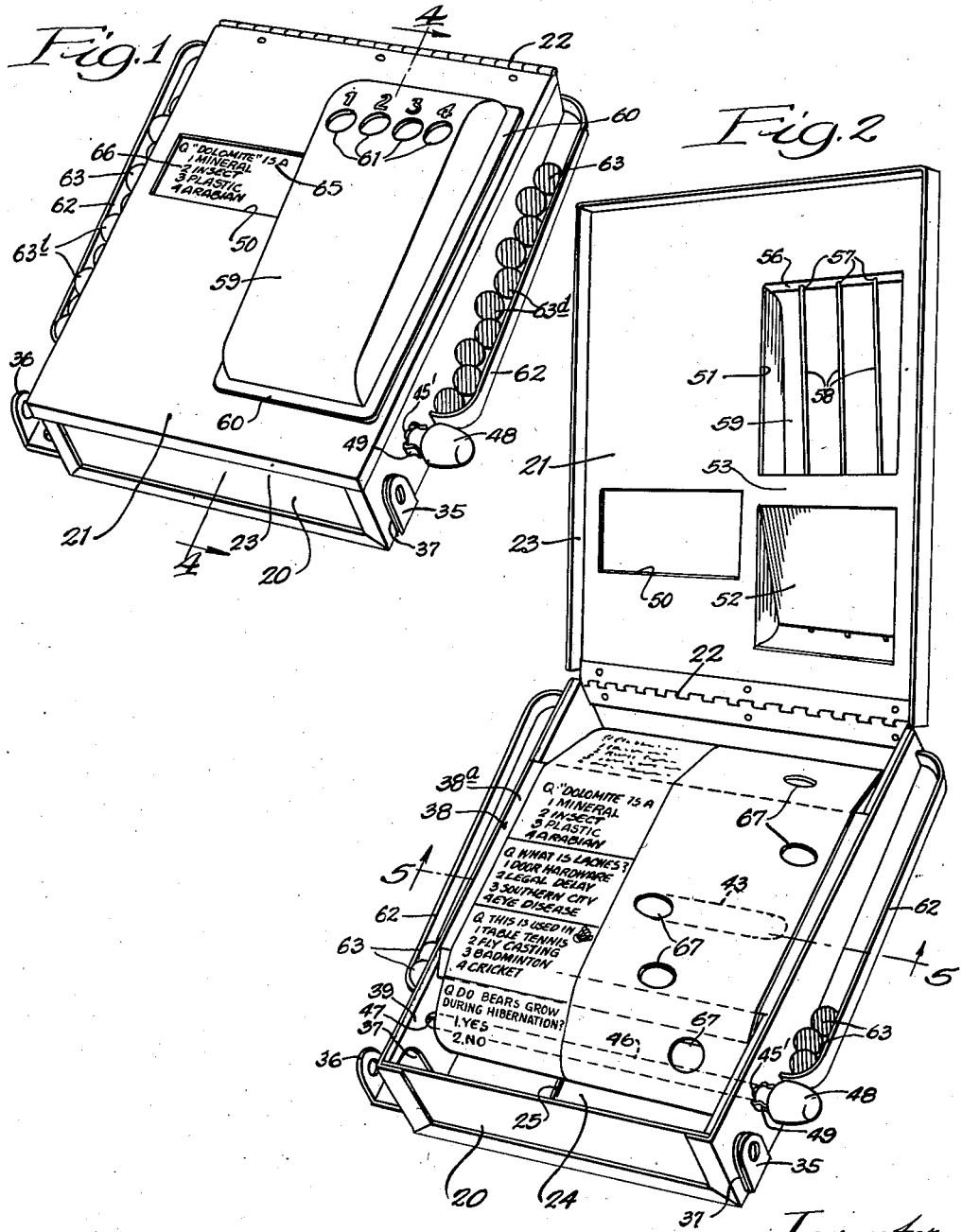

Feb. 16, 1943. G. W. EMMERT 2,311,217
QUIZ GAME
Filed March 31, 1941 4 Sheets-Sheet 3
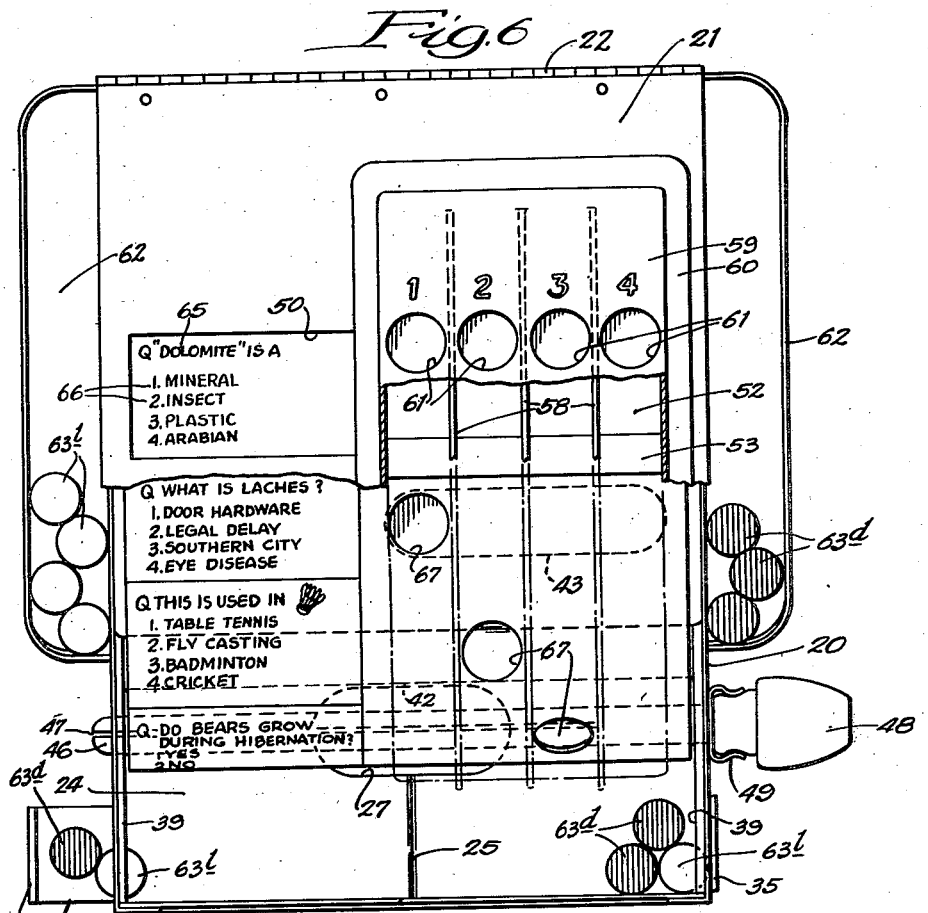
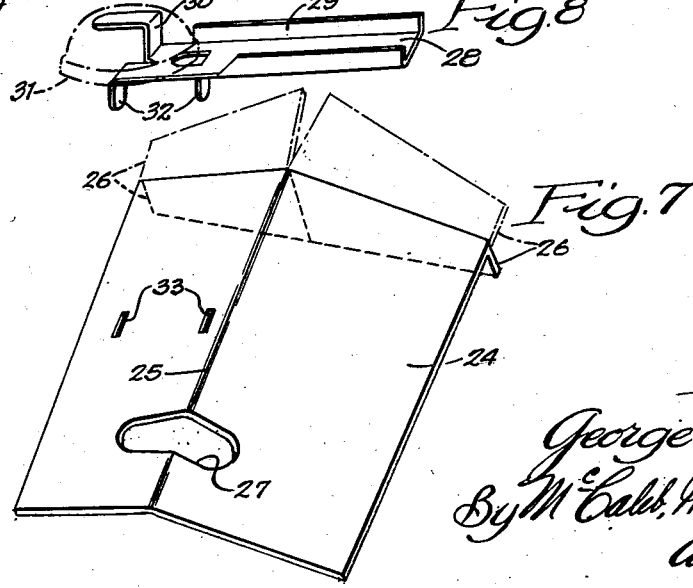
Inventor:
George W. Emmert.
By McCaleb, Hendl & Dickinson
Attorneys.

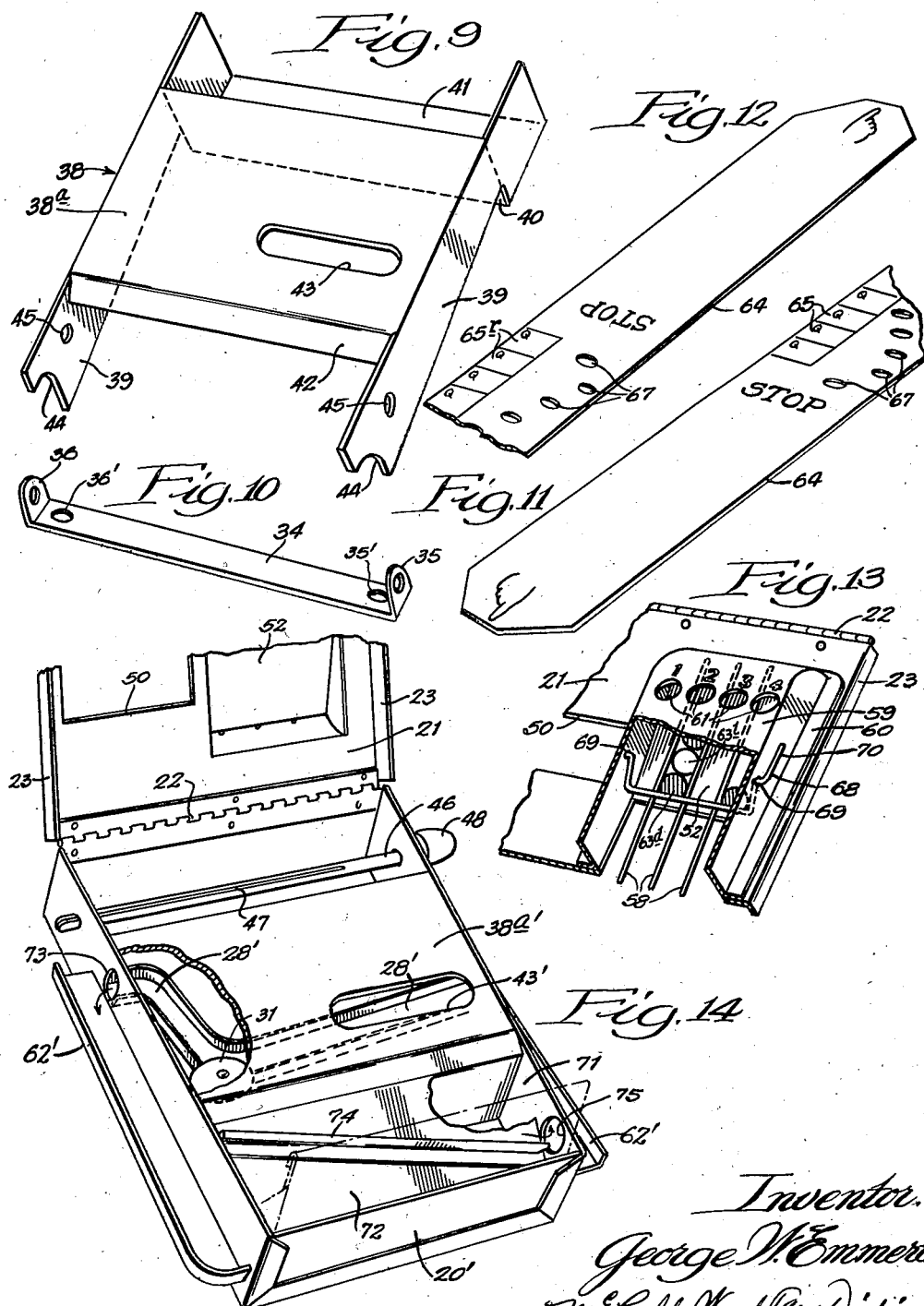

Patented Feb. 16, 1943

2,311,217

UNITED STATES PATENT OFFICE 2,311,217

QUIZ GAME

George W. Emmert, Evanston, Ill.

Application March 31, 1941, Serial No. 386,142

20 Claims. (Cl. 35—48)

My invention relates to a quiz game—a questioner device which may be played as a game in which the player or players endeavor to select the correct answers to questions presented.

More particularly, my questioner is one where a series of questions appear on a sheet or roll of paper, and are successively presented along with a set of possible answers. Means are provided for the player to indicate his selection of the correct answer, and the device is preferably so arranged that it will both indicate if the selected answer is the correct one and keep a score for each player.

Among the features and advantages of my questioner are these:

The operation is non-electrical, whereby I obviate the original and maintenance expenses and nuisances of batteries, plug-in cords, lamps, buzzers, fire hazards, etc.

The element by which the player indicates his choice of answers—which element is preferably a ball in my questioner, as distinguished from the key, button, contact prod, or the like, generally employed in electric questioners—itself serves the further functions of directly and immediately cooperating with the device and the question sheet or roll, directly and proximately actuating the indicator or signal if the selected answer is the correct one, and constitutes the scoring element. By thus combining all four of those functions in one simple and inexpensive element such as a ball, I avoid the complication, possibility of failure, and expense of the more formal mechanisms, circuits and the like which have heretofore been employed for effecting those functions.

The automatic, yet extremely simple, scoring provided by my questioner will accurately keep the score of several players who are playing the game together on one questioner, until each has completed his series of questions. And this is true even though each of several players in rotation answers each question before any proceed to the next question.

In addition to keeping score, my questioner is arranged to indicate to each player at any time how many more questions he is to answer, and this also constitutes a check to assure that each player answers a certain number, and only a certain number, of questions in a series or round of play.

In an instance where, for example, each player of a group is to answer each question, my questioner may be so operated that the correctness of no player's selection will be indicated to him or the other players until after all of the players have answered the question.

In any electrical or mechanical questioner which determines the correctness of the selected answer, there must be included some secret structure. In electric questioners this has often been a supposedly secret wiring in the apparatus, but one which a constant player may often memorize, thereby defeating the purpose of the secrecy. In my questioner, the secrecy is not incorporated in the fixed device or apparatus, but instead the secrecy is incorporated in the structure of the question sheet or roll which may be different for each question and for each roll or sheet, and hence not subject to the advantage of having been memorized by a player confronted with a new question sheet or roll. These secret structures in the question roll are so arranged, and the apparatus itself is so arranged, that the secrecy is well preserved both while the roll is in use and while the roll is being put into or taken out of the apparatus.

The normal number of questions on a question roll is doubled at only trifling increase in cost and without substantial sacrifice of the factor of secrecy, by the expedient of putting questions on both sides of the roll.

The number of rolls which may be devised and used with any questioner apparatus unit is unlimited, the rolls are quite inexpensive to manufacture, and it is very easy and simple to change rolls. The doubling of the number of questions per roll by putting questions on both sides cooperates peculiarly with the facility of changing rolls because, since both sides of the roll are used, no rewinding between plays is required.

My question roll requires no spool in storage. In use, in my questioner device, the supply part of the roll requires no spool. The spool on which the roll is accumulated in play is very easily freed from binding engagement by, and withdrawn from, the roll. Thus the spool or spindle cost is reduced to one per device, with no extra spools required for extra rolls.

My questioner device is built into and housed by a simple rectangular box, making it self-contained, and the box itself may lie flat on the table, with the cover horizontal, despite the requirement of pitch for rolling balls under gravity. The device may be made largely from inexpensively fabricated cardboard and sheet metal.

Despite almost ideal specification of function and performance of my questioner, the device and its operation are surprisingly simple, economical to manufacture, and accurate in operation.

While my questioner is presented as a quiz game, my questioner is in a form which, without any change, may advantageously be used for the most strictly educational purposes. For highly specialized purposes the questions and answers may be written in by typewriter or free hand, where there is no occasion for the quantity production which would justifying printing. Thus, my questioner is quite flexible in its adapatation.

My questioner is, incidentally, well adapted to the extensive use of pictures in connection with questions and answers.

The foregoing, together with further objects, features and advantages of my invention, are set forth in the following description of specific embodiments thereof which are illustrated in the accompanying drawings, wherein:

Fig. 1 is a perspective view of my questioner device with a question roll mounted therein ready for play;

Fig. 2 is a perspective view like Fig. 1, except that the lid has been swung up;

Fig. 3 is a view like Fig. 2, except that the roll has been omitted;

Fig. 4 is a longitudinal vertical section through the questioner along the line 4—4 of Fig. 1;

Fig. 5 is a transverse vertical section taken on the line 5—5 of Figs. 2 and 4;

Fig. 6 is a plan view of the questioner, as shown in Fig. 2, with the forward half of the lid broken away;

Fig. 7 is a perspective view of the false bottom of the box of the questioner;

Fig. 8 is a perspective view of the chute and bell mount;

Fig. 9 is a perspective view of the platen member;

Fig. 10 is a perspective view of the ball-retaining slide;

Fig. 11 is a perspective view of one end of the question roll with its obverse side up;

Fig. 12 is a perspective view of the other end of the same question roll with its reverse side up;

Fig. 13 is a detail perspective, partly broken away, of a rear corner of the lid showing a modification for retaining the balls played by each player in response to one question, until all players have answered the question; and Fig. 14 is a perspective view, somewhat like Fig. 3, but showing another modification.

My questioner comprises, in general, a box-like device or unit, a question roll (which may be one of many) employed therein, and a number of balls or marbles by which the playing is carried out.

The body of the device is a simple cigar-box-shaped box 20 of sheet metal or cardboard with a front wall, a back wall, two side walls, and a bottom, and a lid 21 hinged at 22 to the top of the back wall. The lid has a downturned marginal flange 23 which overlies the upper edges of the sides and front of the box when the lid is down. The lid is preferably of sheet metal even though the box be of cardboard or wood. The structure of my unit will best be understood if it is described in the order of its assembly.

The false bottom 24 (Fig. 7) is in the general shape of a shallowly pitched barn roof with a central longitudinal ridge 25. It is economically formed from a sheet of cardboard stock, the blank originally including coplanar rear end flaps 26, separated by a V-notch, which are subsequently turned down into vertical position with the adjacent ends abutting. The false bottom 24, in its original blanking, is provided with a centrally located, transversely elongated opening 27.

A ball chute 28 (Fig. 8) is formed from sheet metal to provide an upwardly facing channel 29 along more than its right half. At its left half, it has an upwardly and leftwardly struck finger 30, providing a mount for a bell 31, which is set over the finger 30 and spot welded to the terminal offset thereof. Tongues 32 are struck downwardly from the chute 28.

The chute 28 is mounted upon the false bottom 24 by means of the depending tongues 32, which pass through slots 33 in the left panel of the false bottom 24 and are turned therebeneath, as shown in Fig. 5. The chute 28 thereby becomes substantially coplanar with the laterally inclined left panel of the false bottom.

The ball-retaining slide 34 of Fig. 10 is a narrow strip of metal with upturned right and left ends 35 and 36. Holes 35' and 36' pass through the bottom reach of the strip near the respective upturned ends. The holes are a little too small for the balls to pass through. The over-all length of the ball-retaining slide exceeds the width of the box by a little more than the diameter of a ball. The slide 34 is assembled in the box 20 by inserting it through the slide openings 37 in the side walls of the box near the front wall, until the upturned ends lie on either side of the box.

Then the preassembled false bottom 24, ball chute 28 and bell 31 are set into the box 20, as shown in Figs. 4 and 5, with the front end of the false bottom lying against the front wall of the box and the lateral edges of the false bottom lying at the bottom of the side walls of the box and also passing over the ball-retaining slide 34 which lies directly on the floor of the box. The downturned end flaps 26 of the false bottom raise its rearward end a fraction of an inch higher than its front end, with the result that the ridge 25 and the left and right panels of the false bottom pitch forwardly in addition to the panels pitching laterally.

The platen piece 38 (Fig. 9), which likewise may be formed from a single piece of cardboard, comprises a horizontal platen 38a of the width of the inside of the box but of considerably lesser length, lateral flanges 39 depending therefrom and extending beyond the platen both at the front and at the back, and a downturned vertical wall 40 depending from the front edge of the platen 38a, which front wall terminates in a rearwardly turned horizontal flange 41. The forward edge of the platen 38a extends below a slightly downturned narrow apron 42. On its left-hand side, the platen 38a is penetrated by a transversely disposed ball slot 43. The lower front ends of the lateral flanges 39 are cutout, as indicated at 44, so as not to overlie the slide openings 37 in the sides of the box. The lateral flanges 39 of the platen piece also carry spindle holes 45.

It will be noted from Fig. 9 that the lower edges of the lateral flanges 39 of the platen piece are not horizontal and parallel with the plane of the platen, but are somewhat pitched downwardly from the plane of the rear vertical wall 40 to the forward ends of the lateral walls.

After the false bottom is installed in the box, the platen piece 38 is inserted into the box and set upon the false bottom. As shown in Figs. 4 and 5, the forward face of the rear vertical wall 40 of the platen piece lies against the rear faces of the downturned end flaps 26 of the false bottom, and the pitched lower edges of the vertical flanges 39 forwardly of the wall 40 lie upon the lateral margins of the false bottom 24 and conform to the pitch thereof. This brings the platen 38a in the plane just below the top edges of the box 20.

The outer faces of the lateral flanges 39, which have previously been coated with adhesive, are adhered to the inner surfaces of the side walls of the box. This not only fixes the platen piece 38 in position within the box, but it serves, through the platen piece 38, to hold the false bottom in position. The rear horizontal flange 41 of the platen piece 38, as shown in Fig. 4, spaces the bottom of the wall 40 from the back wall of the box 20, and thereby holds the wall 40 against the end flaps 26 of the false bottom to which the wall may be adhered.

When the platen piece 38 is thus installed in the box, the inclined ball chute 28 comes directly beneath the ball slot 43 in the platen 38a, and the bell 31 comes under the platen 38a leftwardly of the slot 43.

A wooden spindle 46 is inserted transversely of the box through the aligned spindle holes 45 in the lateral flanges of the platen piece and the registering spindle holes 45' in the side walls of the box. The spindle 46, which is somewhat longer than the width of the box, is diametrically and longitudinally slitted at 47 for the greater portion of its length inwardly from its far end, its other end being provided with a knob 48 which limits its insertion into the box. It is upon this spindle 46 that the question roll is accumulated.

Spring clips 49 carried on the outside of the box adjoining the near spindle hole 45' co-operate with a shallow annular groove associated with the knob 48 frictionally to hold the spindle against rotation and to restrain it against casual axial displacement.

On its left-hand side the lid 21 of the box is provided with a window 50 through which, successively, the questions, together with their associated answers, are exposed. On its right-hand side and toward its front end, the lid 21 has a rectangular opening 51 (Fig. 2) and, forwardly thereof, a rearwardly and upwardly inclined rectangular leaf 52 formed from the sheet metal of the lid by cutting the two sides and the back edge of the leaf from the lid, but leaving the front end attached to a web 53 of the lid which extends between the leaf 52 and the opening 51. As shown in Fig. 4, the rear end of the leaf 52 is upwardly flanged at 54 and carries a set of three spaced wire receiving holes 55. Somewhat similarly, the forward margin of the rectangular opening 51 is upwardly flanged at 56 and carries a similarly spaced set of wire receiving holes 57. A set of three guide wires is mounted in the respective holes 55 and 57, whereby the front end of each wire is supported in the flange 56 and the rear end in the flange 54. The wires are but a little longer than the distance between the flanges. Because of the inclination of the leaf 52, the wires 58 are pitched downwardly somewhat.

A rectangular turret 59 (Figs. 1 and 4), which is open on its bottom, is set over the wires 58, leaf 52 and rectangular opening 51 and fixed to the top side of the lid as by welding the marginal flanges 60 of the turret flatwise to the body of the lid. As shown in Fig. 4, the downwardly turned ends of the turret 59 act as stops for the wires 58 to prevent their passing out of their mountings in the flanges 54 and 56. Near its front end, the top of the turret 59 carries a set of four ball-receiving holes 61 conspicuously numbered 1, 2, 3, and 4, and arranged in a transverse row.

Ball storage racks 62 are fixed—preferably detachably—along the sides of the box. The racks 62 are pitched forwardly to keep the balls at the near ends of the racks. In the form here shown, one rack will contain ten balls 63 for one player and the other rack, ten balls for a second player. If there are to be four players, ten balls each may be stored elsewhere, or more racks 62 may be carried on the sides or front of the box. The ten balls comprising the set for each player are preferably colored alike but different from the colors assigned to other players. As here illustrated, the balls 63e on one player's rack 62 are light colored, while the balls 63d on the other player's rack are dark.

The question roll 64 (referring to Figs. 2, 6, 11 and 12) is a long strip of paper of width a little less than the inside width of the box 20 and of a length of perhaps three or four feet. The corners of each end are cut off obliquely to facilitate threading the ends into the longitudinal slit of the spindle 46. A series of questions 65 is printed along the left-hand half of the obverse side of the question roll. Another series of questions 65r is printed on the same half but on the reverse side of the question roll. Associated with each question, and preferably listed immediately thereneath, is a set of possible answers 66, conspicuously numbered 1, 2, 3, 4, as the case may be. Some times there will be only two answers, as where the question admits of only a yes or no answer. The questions or answers may consist in whole or in part of pictures. Each question and its associated set of answers are confined to a rectangular area conforming with the window 50 in the lid.

In the right half of the question roll, there is a series of ball holes 67, a little larger than the diameter of the balls 63, associated with each question 65, respectively, and also each question 65r, respectively, on the reverse of the roll. That is, any given hole 67 is associated with one question 65 on the obverse and another question 65r on the reverse. The holes 67 are arranged to occupy various of four possible positions laterally of the roll. The rightmost position is position 4, the one next to the left position 3, and so on, as will be apparent from Fig. 6. The ball hole 67 which is associated with a given question 65 is punched through the paper at a lateral position which agrees with the number assigned to the correct one of the four answers 66 associated with that question. Likewise, the question 65r on the reverse of the roll, which is associated with the same ball hole 67, has its associated answers listed in a sequence which will give its correct answer a number corresponding to the position of the associated hole 67.

The hole 67, which is associated with a question 65, is preferably not directly opposite the question and its answers, but offset therefrom some distance longitudinally of the roll. One advantage of this is that it makes it more difficult for a player who has seen the roll exposed to identify the hole 67 and the position thereof which is associated with a given question 65. For use with the device here illustrated, each hole 67 is offset, longitudinally of the roll, from its associated question and answers, but the same distance as the window 50 is offset from the ball slot 43 in the platen 38a.

To install the question roll in the device ready for play, the lid 21 is raised, as shown in Fig. 3, Then the question roll 64, in rolled form, is, as shown in Fig. 4, set transversely of the box in the roll pocket formed between the rear wall of the box 20 and the rear vertical wall 40 of the platen piece 38. The free end of the roll is led over the platen 38a and inserted in the longitudinal slit of the spindle 46, and the spindle is turned to wind a little of the end of the roll thereon. The appearance of the word "Stop" (Fig. 11) on the roll indicates that this preliminary winding is sufficient, and guards against exposure of any of the questions. The friction of the clips 49 on the knob 48 holds the spindle against unintended turning while the friction of the roll against the walls of its pocket toward the rear of the box holds it against unintentional unwinding at the start. Therefore, the roll at such time lies flat on the platen 38a.

The lid is then swung down to closed position, which holds the reach of question roll flatwise in the very shallow space between the under surface of the lid and the platen 38a. Then the knob 48 is turned further until the first question and its associated answers are displayed through the window 50.

The questioner is then ready for play.

The play and operation of the device are as follows:

Assume, as in the instance of the illustrated question and associated set of answers displayed through the window 50 in Figs. 1 and 6, that the correct answer is number 1. The first player has been assigned the ten dark balls 63d in the rack 62. The second player has been assigned the ten light balls 63l in the other rack. Suppose the first player believes that answer number 4 is correct. He takes a dark ball 63d from his rack and drops it in the ball-receiving hole number 4 in the turret 59. (If each player is to answer each question, the player will shield this operation from the view of the other player or players, so that they cannot see which hole 61 the ball is being dropped through. If the second player is not to answer the same question, but another question, this shielding is not necessary.)

The ball dropped through the number 4 opening 61 falls on to the leaf 52. Because the leaf 52 is pitched forwardly, the ball rolls down it and across the web 53 and, under the momentum thus gained, continues to roll along the paper of the question roll which is exposed through the rectangular opening 51 in the lid and over the roll partially accumulated on the spindle 46, falling on to the right panel of the false bottom 24. Because the right panel of the false bottom 24 pitches to the right side of the box and also to the front of the box, the ball will roll toward the right front corner of the box and may remain there along with any other "wrong answer" balls.

Assuming the second player correctly believes that answer number 1 is the correct answer to the exposed question, he drops one of the light balls through the ball-receiving hole 61 which is number 1. That ball rolls along the inclined leaf 52, across the web 53, and on to the paper of the question roll. The ball hole 67 in the question roll associated with the exposed question is in number 1 position. Longitudinally of the roll strip, the hole 67 associated with the exposed question is in register with the ball slot 43 in the platen. Therefore the correctly played ball drops through the hole 67 and the slot 43 into the chute 28, where it runs down the chute to the left, hitting the bell 31, and passing out of the chute 28 on to the left panel of the false bottom 24 and rolling to the left front corner of the box where it may remain with subsequently played "right answer" balls. The impact of the ball upon the bell gives a gratifying audible signal that the correct answer has been played.

The wires 58 and the side walls of the turret 59 co-operate to confine a played ball to a straight longitudinal path in alignment with the ball-receiving hole 61 through which it is dropped. This keeps the ball from crossing over and dropping through a hole 67 which is not in the lateral position corresponding to the hole 61 through which the ball is inserted.

When all of the players have thus answered the one question, the knob 48 is turned to progress the roll, to bring the second question and its associated answers in register with the window 50, and the play is continued with the second ball of each player. When each player has played all ten of his balls, he will have answered ten questions. If all players answer the same questions, ten questions of the question roll will have been used. If only one player answers each question, twenty, thirty, or forty questions on the question roll will have been used. All of the right answer balls will have been accumulated at the left front corner of the box. When they are removed, they furnish an accurate score for each player by the simple expedient of counting the balls of each player. The remaining or wrong answer balls, which are accumulated toward the forward right corner of the box, are then removed and the balls replaced in their racks for another round of play.

The ball-retaining slide 34 may be positioned so that its upturned flanges are equidistant from the respective sides of the box. This will preclude any ball from passing fully through either slide opening 37 in the side walls of the box. When the right answer balls are to be removed and counted, the slide 34 may be pushed as far as possible to the left, which will permit the balls to run out one by one and lodge in the adjacent hole 36' in the slide until successively removed. But in any position in which the slide 34 may be left, the balls will not run freely out of the openings 37 in the box because the first ball out will lodge in the hole 35' or 36' and hold back the others which crowd against it within the corner of the box.

When all of the questions 65 on the obverse of the roll have been played, the knob 48 is rotated further to pass the remaining end of the roll from the forward pocket across the platen and wind the entire roll upon the spindle 46. As soon as the frictional drag of the roll between the platen and the lid has been eliminated, by the end of the roll passing them, the roll will tend to unwind itself as far as is permitted by the slot 27 across the ridge 25 of the false bottom, which slot 27 comes directly beneath the spindle. This unrolling, as confined by contact of the outer convolution of the roll with the margins of the slot 27, frees the inner convolution of the roll from binding contact with the spindle.

The lid is then raised, the roll engaged between the thumb and forefinger, and the spindle pulled out by the knob 48. The passage of the end of the roll through the diametrical slit 47 in the spindle does not impede this withdrawal of the spindle, because the slit 47 extends all of the way to the other end of the spindle.

The roll is removed from the front compartment of the box and inserted in the back pocket or compartment. The spindle 46 is replaced. Then the front end of the roll, with the reverse side up, is pulled out and across the platen and inserted in the slit 47 of the spindle. The operation and play is then continued as previously described, except that a new series of questions is presented on the same roll. After the questions on both sides of the one roll are exhausted, another roll is substituted.

The player cannot see the hole 67 associated with the question exposed through the window 50, and thereby determine which is the correct answer, because, as will be apparent from Figs. 4 and 6, the associated hole 67 is too far removed from the holes 61 and too lacking in light to permit the hole 67 to be seen through any of the holes 61, and the holes 61 would be the only possibility of seeing the hole bearing half of the question roll. And, also, the player is at the front of the box so that this line of vision would be in the wrong direction. The leaf 52 precludes a direct inspection of the hole bearing half of the question roll through the holes 61.

The gap between the spindle 46 and the slot 27 is too small to permit a ball to drop through the slot 27 into the space beneath the false bottom.

In Fig. 13 I have illustrated, as a modification, a simple device which may be incorporated in the turret 59 to hold back the balls played until all of the players have dropped balls through the holes 61 to answer a given question, and then release all of the balls at once. The advantage of this arrangement is that even though all the other players see which answer a player has selected, there is no signal of its correctness until after all of the players have answered the question.

Structurally, this added device is very simple. It consists of a wire crank 68 journaled in holes 69 in the side walls of the turret. The offset reach of the crank normally rests upon the guide wires 58 and forwardly of the bearing hole 69 to come above the inclined leaf 52. Since the balls at that point would protrude considerably above the level of the guide wires 58, the offset reach of the crank 68 will hold them back. When all of the players have answered a given question, the crank 68 is lifted by depressing an exposed arm 70 of the crank, which permits all of the withheld balls to pass on. Even though a plurality of balls have been deposited in the right hole 61 and have been withheld in the corresponding guideway, all of the right answer balls will drop through the registering holes 67 in the question roll and slot 43 in the platen, fall down into the chute and pass into the storage space for the right answer balls, ringing the bell on the way.

In Fig. 14 I have illustrated a modified arrangement of my device. The spindle 46 is journaled to lie in the rear pocket of the box 20', the roll being put in the front compartment 71 and wound to progress it rearwardly instead of forwardly as in the other form. An apron 72 is pivoted along the inside of the lower edge of the front of the box 20', so that it normally lies in the oblique full-line position where its forward edge reaches the front edge of the platen 38a' but may be swung to the vertical dotted-line position of Fig. 14 to permit the insertion of the roll in the front pocket 71.

In this form, which uses the same question roll, a correctly played ball will drop through the hole 67 in the question roll and through the ball slot 43' in the platen and into the ball chute 28' as in the other form. But one difference is that the chute 28', instead of discharging on to a false bottom, passes the bell 31 and turns in a rearward direction to discharge the ball through an opening 73 in the left side wall of the box, and on to a forwardly pitched rack 62'. In this way, when a ball is correctly played, it not only rings the bell but it is discharged into exposed position in the rather apt and intriguing manner of coming toward the player. On the other hand, a ball incorrectly played rolls along the question roll and on to the inclined apron 72 where it is diverted by an obliquely disposed transverse strip 74 and lead through an opening 75 in the right-hand side of the box, where it is discharged into a rearwardly pitched rack 62''. This yields the correspondingly apt result of a wrong answer ball going away from the player.

The structural simplicity of my questioner and its accurate operation are due in no small measure to the design whereby, once a new question is presented for play, there are no moving parts operated in the course of the indication by each player of his selection of an answer, the indication of the correctness of the player's selection, and the record of the score of each player,—save the balls or marbles themselves. The balls, which are very inexpensive and easily replaced if lost, serve the manifold functions of elements by which the players indicate their selections of answers, the means for actuating the right answer signal, and the instrumentalities for keeping score for each player. The device itself is extremely simple, and economical to manufacture and assemble. It is also self-contained and adapts itself to compact packaging for shipment.

My questioner is well adapted for use in situations where more than one of the stated answers associated with the question is correct. In such case more than one hole 67 through the question roll may be associated with the question. For example, suppose the question and associated answers were:

Q. Springfield is a city in
   1. Ohio
   2. Illinois
   3. Iowa
   4. Massachusetts There would then be associated with that question three holes 67 in the question roll in the first, second and fourth positions. Thus, a ball played to select answers 1, 2 or 4 would ring the bell and go to the right answer ball compartment, while a ball played to answer number 3 would not ring the bell and go to the wrong answer ball compartment.

It will be appreciated also that it is not necessary with the device illustrated that the full four possible answers be stated for each question. Where the question is one which requires only a listing of yes and no as the possible answers, those two answers will suffice.

While I have thus described and illustrated these specific embodiments of my invention, I contemplate that many changes and substitutions may be made without departing from the scope or spirit of my invention.

I claim:
1. A questioner comprising a question carrier bearing indicia constituting a question and a set of answers—one of which is correct—associated therewith, a free playing element; a device re- movably receiving and mounting the question carrier and revealing the question and associated answers and having a set of element-receiving passages indicatively associated with the respective answers and leading to an element-receiving right answer region and to an element-receiving wrong answer region, and passage means in the question carrier and concealed by, and co-operating with, the device for diverting the element, when played into the passage corresponding to the correct answer, to the right answer region and, when played into a passage not corresponding with the right answer, to the wrong answer region.

2. A questioner according to claim 1, wherein the device has a plurality of compartments which respectively constitute the right answer and wrong answer element-receiving regions.

3. A questioner according to claim 1, wherein the playing element is a ball.

4. A questioner according to claim 1, wherein the question carrier is a roll of sheet material bearing a series of the questions with a set of the answers associated with each question.

5. A questioner according to claim 1, wherein the question carrier is a sheet.

6. A questioner according to claim 1, wherein the device includes a signal actuated by the element en route to the right answer element region but not en route to the wrong answer element region.

7. A questioner according to claim 1, wherein the free playing element is a ball which passes under gravity along the selected of the passages and into the respective region.

8. A questioner according to claim 1, wherein the free playing element is a ball which passes under gravity along the selected of the passages and into the respective region and wherein the device includes a signal which is directly operated by impact by the ball en route to the right answer element region.

9. A questioner comprising a sheet bearing a indicia constituting series of questions and a set of answers—one of which is correct—associated with each question, a ball, a set of passageways for selectively receiving the ball and guiding it over the sheet, a hole in the sheet associated with each answer and positioned in accordance with the correct one of the set of answers associated with the last-mentioned question, the holes being of a size to pass the ball through the sheet, passage means for receiving the ball when it passes through such a hole in the sheet, and other passage means for receiving the ball if it does not pass through such a hole.

10. A questioner roll comprising a roll of flexible sheet material, a longitudinally arranged series of indicia constituting questions on the obverse of the roll, a set of indicia constituting answers—one of which is correct—on the obverse of the roll and associated with each question, a longitudinally arranged series of indicia constituting questions on the reverse of the roll, a set of indicia constituting answers—one of which is correct—on the reverse of the roll and associated with each of the last-mentioned questions, the roll having a series of holes therethrough associated with the respective questions on the obverse and also associated with the respective questions on the reverse, the position of the holes in relation to the position of the respective questions with which they are associated being arranged in accordance with which answer of the set of answers associated with the associated question is the correct answer, whereby any given hole is associated with one question on the obverse and another question on the reverse and the position of the given hole is indicative of which are the correct answers in the sets of answers associated with the last-mentioned obverse and reverse questions.

11. A questioner roll comprising a rolled strip of paper bearing on its obverse a series of indicia constituting questions and a set of indicia constituting answers—one of which is correct—associated with each question, and also bearing on its reverse another series of indicia constituting questions and indicia constituting a set of answers—one of which is correct—associated with each of the reverse questions, the strip having a series of holes therethrough the strip associated with the respective questions on the obverse and also on the reverse, whereby each hole is associated with one question on the obverse and another question on the reverse, the questions on the obverse and reverse being arranged longitudinally of the strip and the holes being likewise arranged longitudinally of the strip but in various transverse positions.

12. A questioner roll comprising a rolled strip of paper having a longitudinally arranged series of indicia constituting questions and answers on both the obverse and reverse and having a longitudinally arranged series of holes through the strip, each hole, as to its longitudinal position, being associated with a respective question on the obverse and another respective question on the reverse but as to its transverse position being indicative of whichever of the set of answers with the associated question is the correct one.

13. A question sheet for a questioner comprising a strip of paper bearing on its obverse a longitudinally arranged series of indicia constituting question units and on its reverse another longitudinally arranged series of indicia constituting different question units, each question unit comprising a question and a set of answers, one of which is correct, the strip having a longitudinally arranged series of holes therethrough, the holes being associated, by their longitudinal positions, with respect to question units and by their transverse positions with whichever is the correct answer in the set of answers associated with the question unit with which the hole is associated.

14. A question sheet according to claim 13, wherein each hole is associated with a question unit on the obverse and another question unit on the reverse.

15. A questioner sheet for structural co-operation with a questioner apparatus, comprising a long strip of paper or the like bearing a series of indicia constituting question units arranged longitudinally of the strip, each question unit comprising a question and a set of answers, one of which is correct, and the paper thereof having a series of holes therethrough arranged longitudinally of the strip and associated with—but considerably offset longitudinally of the strip from—the respective question units, the holes occurring variously in different transverse positions transversely of the strip, the transverse position of any given hole corresponding with which is the correct answer of the set of answers in the question unit with which the hole is associated.

16. Quiz game apparatus comprising a box, a lid for the top of the box, a platen beneath the lid, a strip of paper within the box having a supply end and an accumulating end, and a reach lying flatwise between the lid and platen, a series of indicia constituting question units carried by the strip, each question unit comprising a question and a series of answers associated therewith, one of which is correct, a window in the lid presenting one question unit at a time, means for progressing the strip to expose successive question units, the lid having a set of ball-receiving holes therethrough, means for identifying the several questions in each set with the several ball-receiving holes in the lid, a free ball to be inserted by a player, pursuant to his choice of answer, optionally through any of the ball-receiving holes, the strip including a hole therethrough associated with each question unit and positioned in accordance with which of the answers of that question unit is the correct one, the apparatus, when a ball is inserted in the proper ball-receiving opening associated with the correct answer displayed in the window, conducting the ball to the hole in the strip associated with the exposed question unit, whereby the ball may pass through the hole to a right answer ball region of the apparatus, but, when a ball is inserted through an improper ball-receiving opening, conducting the ball to a wrong answer ball region without the ball passing through any of said holes.

17. A questioner apparatus comprising a rolled strip of paper or the like constituting a question roll strip and bearing a series of indicia constituting questions with associated sets of answers and having a series of holes therethrough associated with the correct answers of the respective sets, a box having a lid with a window for successively exposing the questions with their respective answers, means defining a set of ball-receiving openings identified with the answers in the set of answers, a platen closely underlying the lid in the region of the window, with the strip extending from the roll on one side of the window flatwise between the lid and platen, a winding spindle journaled in the box at the other side of the window for accumulating the other end of the strip and progressing the strip past the window, the series of holes in the strip being positioned to identify the holes with the respective right answers, and passage means for leading a ball inserted through the ball-receiving opening of the lid, through the hole associated with the exposed question and to a right answer ball region, or, without passing through one of the holes, to a wrong answer ball region, depending upon which ball-receiving opening the ball is inserted into.

18. A questioner apparatus according to claim 17, wherein the spindle is transversely slotted inwardly from one end to receive and anchor the leading end of the roll, and wherein the other end of the spindle carries a knob whereby the spindle is axially withdrawable from the accumulated roll upon the spindle without removing the roll from the apparatus.

19. A questioner apparatus according to claim 17, wherein the ball-conducting means includes, beneath the platen and beneath the hole in the strip which is associated with the exposed answer, an inclined chute for receiving a ball dropping through the hole, and an audible signal to which the ball is directed by the chute to be sounded by impact by the ball.

20. A questioner device to employ a question roll having a series of indicia constituting questions and answers with ball-passing perforations therethrough associated with correct ones of the answers, comprising a box to contain and means to progress the question roll successively to expose questions and associated answers, a platen in the box over which the roll is progressed, a lid for the box having a window over the platen for successively exposing a question and its associated answers on the roll, a turret on the lid to overlie the hole-bearing region of the roll, the lid of the box being adapted to lie horizontally, the turret containing a set of spaced ball-receiving openings, an inclined ball chute in the turret beneath the ball-receiving openings for conducting balls across the reach of roll between the lid and platen, a ball-passing slot in the platen, and passage means for conducting balls passing through a hole in the paper registering with the slot to a region different from that to which the ball is passed if it does not fall through a hole in the roll.

GEORGE W. EMMERT.